United States Patent [19]

Nagano

[11] Patent Number: 4,960,403
[45] Date of Patent: Oct. 2, 1990

[54] BICYCLE DRIVE CHAIN
[75] Inventor: Masashi Nagano, Osaka, Japan
[73] Assignee: Shimano Industrial Co., Ltd., Osaka, Japan
[21] Appl. No.: 386,180
[22] Filed: Jul. 28, 1989
[30] Foreign Application Priority Data
 Aug. 3, 1988 [JP] Japan ................................ 63-193778
[51] Int. Cl.⁵ ............................................ F16G 13/06
[52] U.S. Cl. .................................... 474/213; 474/227; 474/234
[58] Field of Search .......................... 474/206, 212–217, 474/226–228, 232–336; 59/4, 5, 7, 84, 85, 87, 88

[56] References Cited
U.S. PATENT DOCUMENTS
2,546,368 3/1951 McIntosh et al. ................... 474/227
2,687,651 8/1954 Webb ................................. 474/227
4,050,323 9/1977 I'Anson ........................... 474/234 X Primary Examiner—Thuy M. Bui
Attorney, Agent, or Firm—Edwin E. Greigg

[57] ABSTRACT

A drive chain for use in a bicycle having a change-speed apparatus for example. In order to improve the engageability of the chain both in the chain running direction and in the chain deflecting direction for a change speed operation, the chain is constructed generally as a offset type having a series of alternately interconnected first plates and second plates. The improvement in the engageability in the two directions is provided by forming a middle portion of each first plate to be flush with or extend outwardly relative to a wide first connecting portion and also by forming a middle portion of each second plate to extend outwardly relative to the first connecting portion.

8 Claims, 4 Drawing Sheets

BICYCLE DRIVE CHAIN

BACKGROUND OF THE INVENTION

1. Field of the Invention

The present invention relates to a drive chain for use in a bicycle, and more particular to a drive chain used for a bicycle having a change speed apparatus.

2. Description of the Related Arts

A conventional bicycle drive chain of the above-noted type includes a first plate and a second plate each having connecting portions at its opposed ends. These first and second plates are alternately connected with each other through the respective connecting portions with one plate positioned outwardly of the other in the direction of plate thickness. When such drive chain is moved from one gear to another of a multi-gear assembly of the change-speed apparatus, the engagement onto the new gear usually starts between a wide gear hole formed by the second plate positioned outwardly in the transverse direction of the chain and one gear tooth and then is followed in succession by the next gear holes of the chain and the next teeth of the gear, thereby to complete the engagement. In the above, in many cases, the engagement does not start between a narrow hole of the chain and the gear tooth. Then, one conceivable way to improve the width wise engageability of the chain is to further widen the wide gear hole, as suggested e.g. by a Japanese published utility model No. 55-1988, which drive chain is illustrated in FIG. 9. According to this drive chain, a middle portion forming the wide gear hole and positioned between the opposed connecting portions of the second plate is deformed outwardly in the plate thickness direction relative to the connecting portions, such that this second plate can form an even wider gear hole.

On the other hand, there is also known a conventional drive chain commonly referred to as an offset type drive chain. In this offset type, each of the first plate and the second plate has a stepped portion in a middle position thereof so as to allow a first connecting portion of one plate to be positioned outwardly of a second connecting portion of the other plate in the transverse direction of the chain. Then, a plurality of these plate pairs are alternately connected with each other via pins with a narrow connecting portion of one plate being positioned inwardly of a wide connecting portion of the other plate in an overlapped manner.

With the above-described drive chain of the Japanese utility model publication No. 55-1988, the improvement of the gear-engageability of the chain is attempted merely by further increasing the width of the wide gear hole formed in between an opposing pair of second plates. Therefore, the chain gear engagement opportunity is still limited to that between the wide hole and the gear teeth, with no improvement being made in the engagement opportunity of the narrow gear holes. Further, with this prior construction, when there occurs a significant displacement between the hole line of the chain and the teeth line of the gear for a change-speed operation, the chain often fails to engage with the gear and slips off the same. Describing more particularly, such chain-gear displacement usually occurs when the chain line deflectes at one of its wide hole from the gear teeth line, which condition is illustrated in FIG. 9. In this FIG. 9, the moving direction of the gear teeth is denoted by an arrow. In this condition, a pair of leftside first and second plates Al and B1 are properly engaged with the gear teeth whereas the next second plate B2 forming the following wide gear hole b1 is displaced from 1 he center of the gear teeth line. Accordingly, the inner wall of the first plate A2 forming the rightmost narrow gear hole a2 rides on the top edge of corresponding gear tooth, thereby interferring with the proper chain gear engagement. Then, any effective means to overcome this problem has not been provided in the aforementioned offset type drive chain either.

In view of the above described state of the art, the primary object of the present invention is to overcome the above problem of the prior art by providing an improved drive chain which permits proper chain-gear engagement from either of the gear holes formed by the first and second plates and which can effectively prevent such riding of a plate on a gear tooth even if the chain line is deflected from the center of a gear teeth line.

SUMMARY OF THE INVENTION

In order to accomplish the above-noted object, in a bicycle drive chain having a plurality of alternately connected first and second plates each having first and second connecting portions at opposed ends thereof, with the second connecting portion of one plate being fitted inwardly of the first connecting portion of the other plate, according to the invention, an entire side face of said first connecting portion is deformed outwardly in the transverse direction of the chain relative to said second connecting portion, said first and second connecting portions being interconnted with each other via respective middle portions At least one vertical end of said middle portion of the first plate is formed flush with or outwardly in the chain transverse direction relative to said first connecting portion. And, at least one vertical end of said middle portion of the second plate is formed outwardly in the chain transverse direction relative to said first connecting portion.

The above described drive chain of the invention is constructed in general as the offset type, such that the first connecting portion may be positioned outwardly in the chain transverse direction relative to the second connecting portion. Further, in the first plate, at least one of the ends in the height direction of the middle portion positioned between the opposing connecting portions is formed flush with or outwardly in the chain transverse direction relative to the wide first connecting portion. With these features of the invention, in comparison with the conventional construction, at least the entrance of the gear hole formed by the first plate may have a width twice as great relative to the second connecting portion by the double of the amount of displacement. In addition, at least the entrace of the gear hole formed by the second plate may have an even greater width than that of the gear hole formed by the first plate. Consequently, with the effectively increased widths in both of the holes formed by the first plates and those formed by the second plates, the entire chain may readily engage with the gear either from the gear hole of the first plate and that of the second plate. Moreover, since the invention's chain has eliminated the narrow gear holes of the conventional construction, even when the center of the chain line is deflected from the center of the gear teeth, there will not occur the trouble of engagement failure due to riding of the chain plate on a gear tooth as coming into contact with the top edge of the gear.

Moreover, since at least one of ends in the height direction of the middle portion of the second plate is formed outwardly in the chain transverse direction relative to the first connecting portion, the gear engagement at this portion of the chain is further facilitated and thus a good engageability at this particular chain portion in the chain transverse direction is maintained, whereby the chain gear engageability on the whole has been further improved.

Further and other objects, features and effects of the invention will become apparent from the following more detailed description of the embodiments of the invention with reference to the accompanying drawings.

DESCRIPTION OF THE PREFERRED EMBODIMENTS

Preferred embodiments of the present invention will be particularly described hereinafter with referece to the accompanying drawings.

Figure 1:
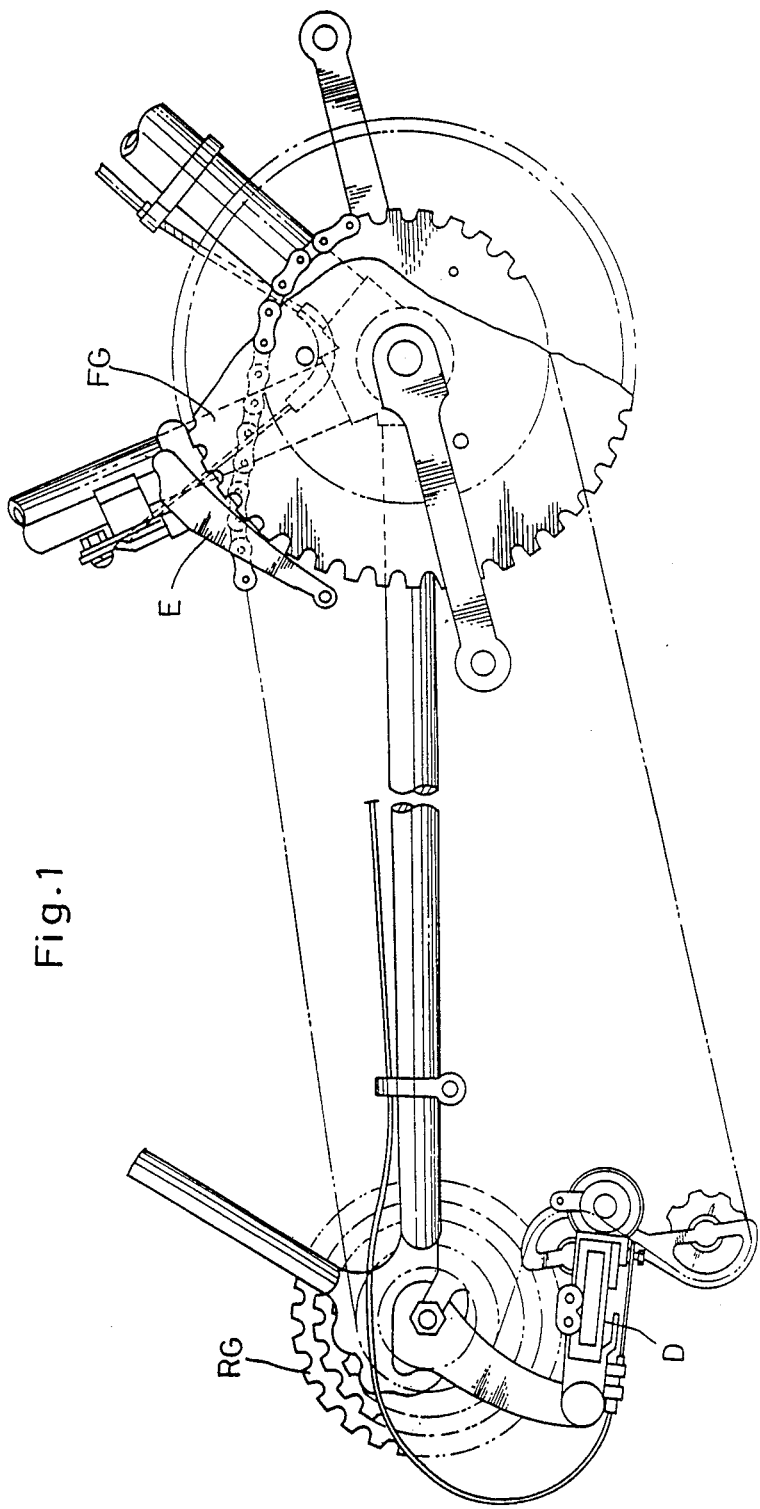
FIG. 1 illustrates a condition in which a drive chain related to the present invention is put to use.
Figure 2:
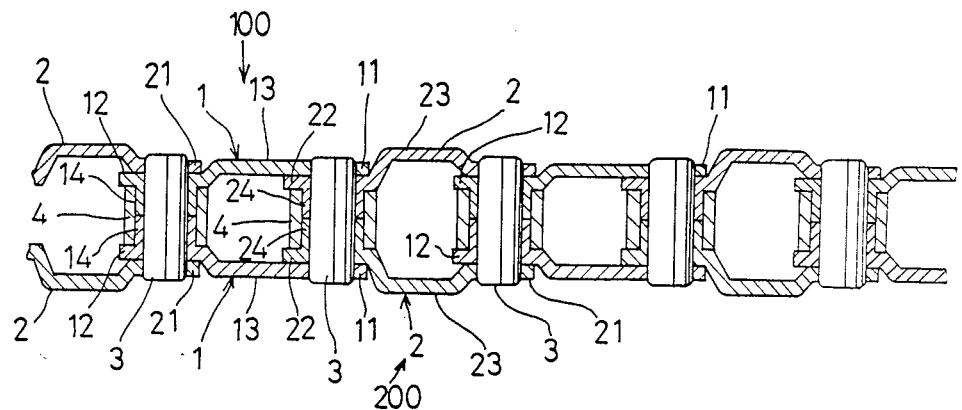
FIG. 2 is a section view showing one preferred embodiment of the chain of the invention.
Figure 3A:
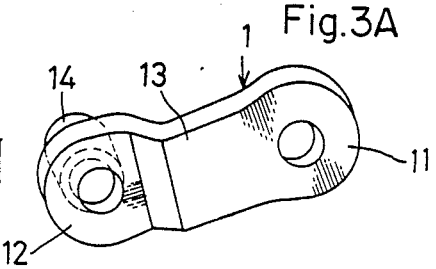
FIGS. 3A and 3B are a perspective view and a side view of a first plate used in the chain of the embodiment of FIG. 1, respectively.
Figure 3B:
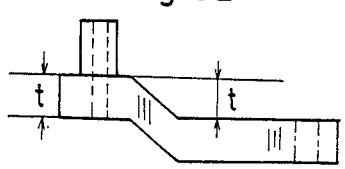
Figure 4A:
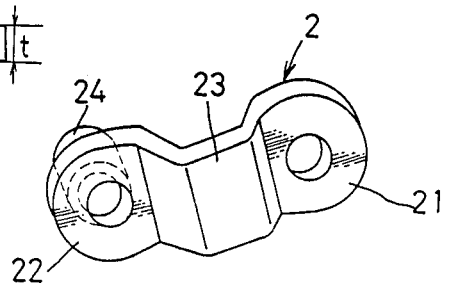
FIGS. 4A and 4B are a perspective view and a side view of a second plate used in the chain of the embodiment of FIG. 1, respectively.
Figure 4B:
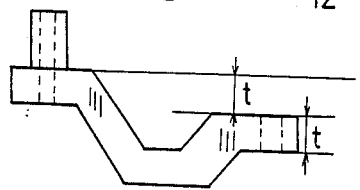

As shown in FIG. 1, a drive chain related to the present invention is adapted for use in e.g. a bicycle capable of providing a plurality of speeds by selectively moving the chain entrained between a front multi-gear assembly FG and a rear multi gear assembly RG by means of a front derailleur E and a rear derailleur D, respectively. FIGS. 2 through 4 illustrate one preferred embodiment of the drive chain. The drive chain includes a plurality of first and second plates 1 and 2 each having a first connecting portion 11 or 21 and a second connecting portion 12 or 22 at opposed lateral ends thereof and connected in alternate series to each other via connecting pins 3. Also, these first and second plates 1 and 2 have the same thickness 't'. The plate connection is of the so called offset type, in which the respective second connection portions 12 and 22 of one plate 1 or 2 are positioned inwardly of the first connecting portions 11 and 21 of the other plate 2 or 1. Further, in the vicinity of each pin 3 and an outer periphery of the respective connecting portion of the plate 1, 2, there is supported a roller 4 in the same manner as in the conventional chain construction. Referring more particularly, as illustrated in FIGS. 3A and 3B, the first plate 1 has the first and second connecting portions 11 and 12 at its opposed lateral ends thereof, such that a symmetrical pair of the same together form a first plate portion 100 as illustrated in FIG. 2 which is a plane view of the chain. Similarly, as illustrated in FIGS. 4A and 4B, the second plate has the first and second connecting portions 21 and 22 at its opposed lateral ends thereof, such that a symmetrical pair of the same together form a second plate portion 200 as illustrated also in FIG. 2. In these first and second plate portions 100 and 200, the second connecting portions 12 and 22 each constituting a narrow connecting portion are positioned in between, i.e. inwardly of the first connecting portions 11 and 21 each constituting a wide connecting portion, with each pair of connecting portions 11 and 22 or 21 and 12 being connected to each other via the common pin 3. More particularly, the plate connection is effected as the pins 3 are inserted through hollow cylindrical portions 14 and 24 formed integrally with the first and second plates 1 and 2, respectively, and the rollers 4 are rotatably fitted on the cylindrical portions 14 and 24. As the method of forming these hollow cylindrical portions 14 and 24 extending from the periphery of the pin holes towards the inside in the plate thickness direction, the barring method is employed, for example.

In this particular embodiment of the present invention, as shown in FIGS. 3A, 3B, 4A and 4B, in the first plate 1, an entire face of its first connecting portion 11 and a middle portion 13 between the first connecting portion 11 and the second connecting portion 12 are displaced from each other relative to the second connecting portion 12 in the plate thickness direction by a predetermined amount (the amount at least substantially equates with the plate thickness 't'). On the other hand, in the second plate 2, the entire face of its first connecting portion 21 is displaced outwardly relative to the second connecting portion 22 by a predetermined amount (the amount at least substantially equates with the plate thickness 't') and also an entire face of its middle portion 23 between these connecting portions 21 and 22 is displaced further outwardly relative to the first connecting portion 21. This double-displacement arrangement effectively enlarges the width of the gap formed in between a symmetical pair of the middle portions 23. That is to say, the first plate 1 has one stepped portion, whereas the second plate 2 has two stepped portions.

With the above-described construction, it becomes possible to widen the gap, i.e. gear hole in between the middle portion pair 13 of each first plate 1 by an extended amount corresponding to the double of the displacement amount 't', in comparison with the gear hole formed in between the plate pair of the conventional drive chain. Accordingly, when this drive chain is moved for a change speed operation as used with a mutli-gear assembly by means of e.g. the rear derailleur D, the engagement of the chain onto a new gear may take place equally smoothly either from its gear engaging hole formed by the first plate portion 100 or from that formed by the second plate portion 200, whereby the engageability of the entire chain may be improved. That is to say, when a leading tooth of the new gear comes into contact with the smaller displacement gear hole of the first plate portion 100, the tooth may smoothly engage with the hole because of the displacement. Whereas, when the leading tooth comes into contact with the larger-displacement gear hole of the second plate portion 200, the engagement takes place equally smoothly. In this respect, there occurs substantially no difference in the engageabilities of the two different chain holes formed by the first and second plate portions, respectively. Accordingly, the chain engageability in the chain running direction may be improved.

Further, since one middle portion 23 of the middle portions 13 and 23 of the respective plates 1 and 2 has the further extended displacement amount, the engageability of the chain hole (i.e. equivalent of the wide chain hole of the conventional chain) of the second plate portion 200 per se is further improved in the chain deflecting direction. Consequently, the drive chain as the whole achieves a uniformly good engageability both in the chain running direction and the chain deflecting direction.

Figure 8:
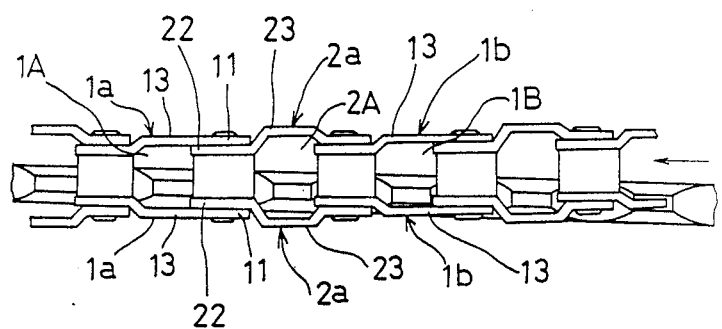
FIG. 8 shows a condition in which the chain of the present invention is positioned with a deflection relative to a gear to be engaged.
Figure 9:
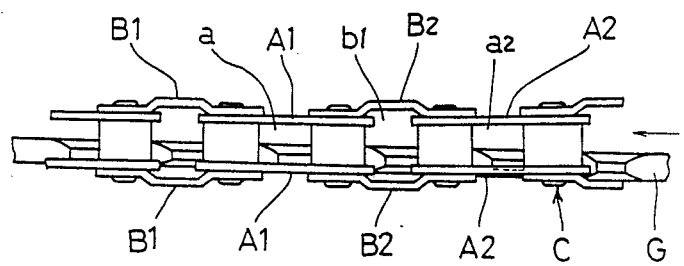
FIG. 9 shows a condition in which a chain of the prior art is positioned with a deflection relative to a gear to be engaged.

FIG. 8 illustrates a case where the chain gear engagement starts from the smaller displacement gear hole 1A formed by the first plate portion 100 (i.e. the gap formed between the first plates 1a in the drawing). In this case, as shown, the chain line is placed out of alignment relative to the center of the gear teeth train. Then, as the gear rotation advances in the direction denoted by an arrow in FIG. 8, the gear deflection in the plate thickness direction begins to appear significantly from the larger-displacement gear hole 2A formed by the second plates 2a following the smaller displacement gear hole 1A formed by the first plates 1a. However, since the next smaller displacement gear hole 1B is formed wider than the narrow chain hole of the conventional chain, the engagement can take place at this hole still smoothly without the lower plate walls riding on the gear tooth. Accordingly, a chain disengagement accident may be effectively avoided in this case also.

Still further, with the above-described construction, the entire faces of the first connecting portions 11 and 21 of the respective plates 1 and 2 are formed with the outward displacements in the chain transverse direction relative to the corresponding second connecting portions 12 and 22. Therefore, the middle portions 13 and 23 may be formed wide very easily, thereby to minimize the manufacturing costs required for the same.

Alternate Embodiments

Some alternate embodiments of the invention will be specifically described next.

Figure 5:
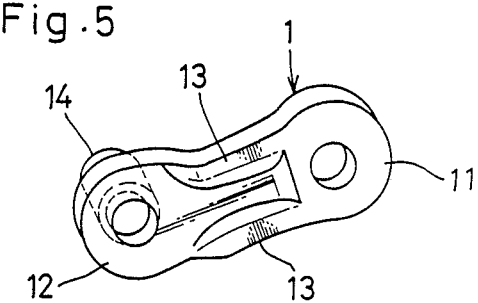
FIG. 5 shows a first plate of an alternate embodiment which plate has a bulging portion only at one vertical side thereof.
Figure 6:
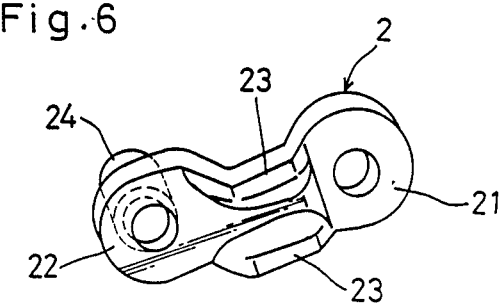
FIG. 6 shows a second plate of an alternate embodiment which plate has a bulging portion only at one vertical side thereof.
Figure 7:
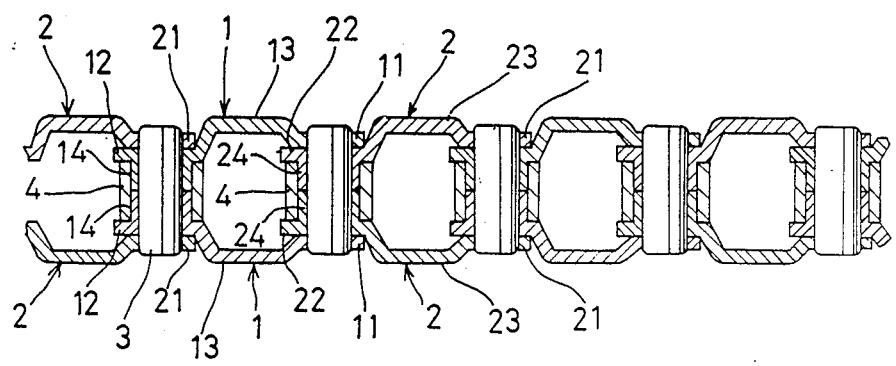
FIG. 7 shows a drive chain of a further embodiment of the invention.

In the previous embodiment, the entire faces of the middle portions 13 and 23 of the first and second plates 1 and 2 are deformed outwardly in the chain transverse direction relative to the first connecting portions 11 and 21 and to the second connecting portions 12 and 22. Instead, as illustrated in FIGS. 5 and 6, it is also conceivable to deform both or either of vertical ends of the middle portions 13 and 23. With this alternate arrangement also, the initial chain-gear engagement is determined by the deformed end(s) and then the chain is guided towards its center, whereby the same effect as by the arrangement of the previous embodiment may be achieved. Still alternately, it is also conceivable for both of the middle portions 13 and 23 to have a displacement greater than that of the respective first connecting portions 11 and 21. In this construction of FIG. 7, the gear engaging holes in between the plate pairs may be engaged with a new gear under the optimum condition throughout the entire length of the chain, whereby the engageability of the chain may be further improved. Moreover, since the first and second plates 1 and 2 may be formed identical with each other, the chain assembly will be significantly facilitated thereby to further reduce the manufacturing costs of the chain. Also, the disengagement accident due to the chain line deflection may be further reduced.

Having described various modifications conceivable within the scope of the invention, it is to be noted, if such a drive chain is used in a bicycle having a multigear assembly, the number of gears constituting the assembly imposes a practical limit on the width of the drive chain and another limit on the width is imposed by the shape of gear with view to the running stability of the bicycle. On the other hand, considering the facility of a chain gear engagement for a change speed operation, the constructions described in the foregoing embodiments are the most advantageous. That is to say, the above described various modifications of alternate embodiments are to provide the benefit to permit a number of choices to be taken in consideration with varied situations and necessities.

Incidentally, although reference marks and numerals are provided in the appended claims for a patent application, it is to be understood that these marks and numerals are not to limit the scope of the invention to the constructions illustrated in the accompanying drawings.

What is claimed is:

1. A bicycle drive chain having a plurality of alternately connected first and second plates each formed of a pair of members having substantially uniform thickness over their length and having first and second connecting portions at opposed ends thereof, with the second connecting portion of one plate being fitted inwardly of the first connecting portion of the other plate, wherein an entire side face of said first connecting portion is deformed outwardly in a transverse direction of the chain relative to said second connecting portion, said first and second connecting portions being interconnected with each other via respective middle portions, at least one vertical end of said middle portion of the first plate being formed flush with or outwardly in the chain transverse direction relative to said first connecting portion, at least one vertical end of said middle portion of the second plate being formed outwardly in the chain transverse direction relative to said first connecting portion.

2. A bicycle drive chain as defined in claim 1, wherein an entire face of said middle portion of said first plate is formed flush with said first connecting portion of said first plate and an entire face of said middle portion of said second plate is displaced outwardly in the chain transverse direction relative to said first connecting portion of said second plate.

3. A bicycle drive chain as defined in claim 1, wherein said vertical ends alone of said middle portion of said first plate are formed flush with said first connecting portion of said first plate and said vertical ends alone of said middle portion of said second plate are deformed outwardly in the chain transverse direction relative to said first connecting portion of said second plate.

4. A bicycle drive chain as defined in claim 1, wherein both of said middle portions respective of said first and second plates are displaced outwardly relative to said first connecting portions of respective first and second plates, said first and second plates being formed identical with each other.

5. A bicycle drive chain having a plurality of alternately connected first and second plates each having first and second connecting portions at opposed ends thereof, with the second connecting portion of one plate being fitted inwardly of the first connecting portion of the other plate, wherein an entire side face of said first connecting portion is deformed outwardly on a transverse direction of the chain relative to said second connecting portion, said first and second connecting portions being interconnected with each other via respective middle portions, at least one vertical end of said middle portion of the first plate being formed flush with or outwardly in the chain transverse direction relative to said first connecting portion, at least one vertical end of said middle portion of the second plate being formed outwardly in the chain transverse direction relative to said first connecting portion, and an amount of a displacement of said respective first connecting portions relative to said respective second connecting portions equates with a thickness of each of said first and second plates and an amount of a displacement of said vertical end of said middle portion of said second plate equates with the plate thickness.

6. A bicycle chain as defined in claim 5, wherein both of said middle portions respective of said first and second plates are displaced outwardly relative to said first connecting portions of respective first and second plates, said first and second plates being formed identical with each other.

7. A bicycle drive chain as defined in claim 5, wherein an entire face of said middle portion of said first plate is formed flush with said first connecting portion of said first plate and an entire face of said middle portion of said second plate is displaced outwardly in the chain transverse direction relative to said first connecting portion of said second plate.

8. A bicycle drive chain as defined in claim 5, wherein said vertical ends alone of said middle portion of said first plate are formed flush with said first connecting portion of said first plate and said vertical ends alone of said middle portion of said second plate are deformed outwardly in the chain transverse direction relative to said first connecting portion of said second plate.

* * * * *